March 15, 1927.
S. HEATH
1,620,968
PROPELLER BLADE MOUNTING
Filed Oct. 8, 1923
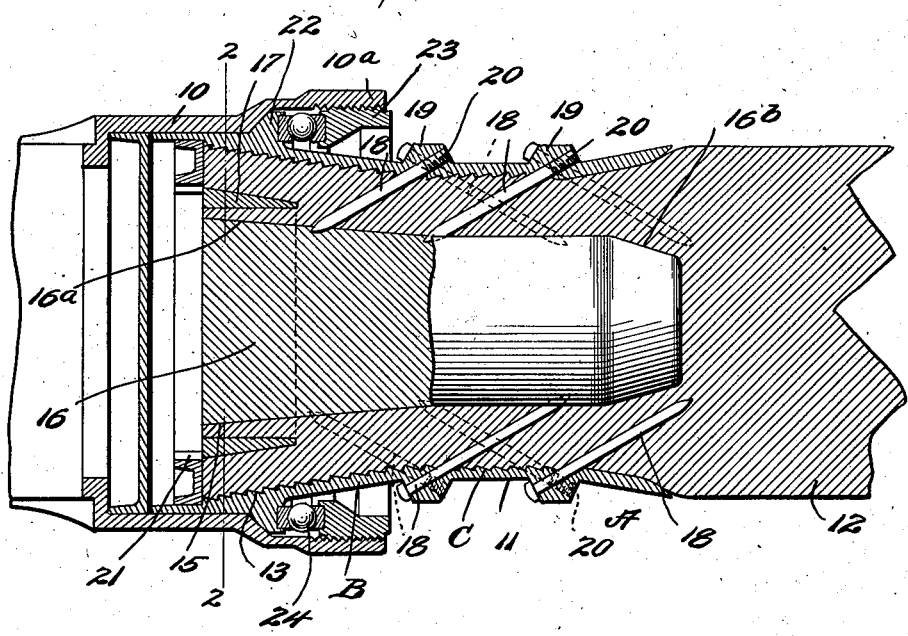
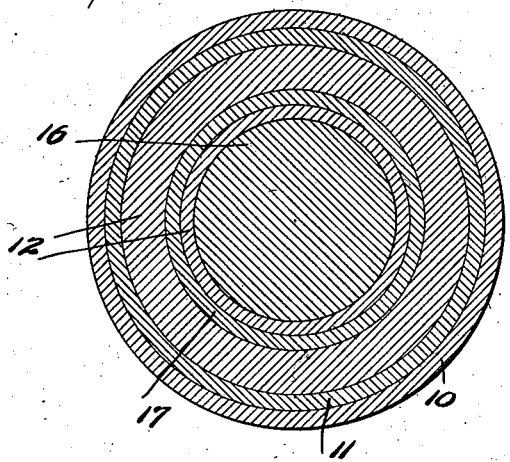
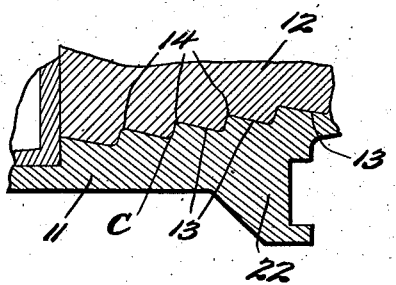
Inventor
Spencer Heath
By Watson, Coit, Morse & Grindle
Attorneys Patented Mar. 15, 1927.

1,620,968

UNITED STATES PATENT OFFICE.

SPENCER HEATH, OF BALTIMORE, MARYLAND.

PROPELLER-BLADE MOUNTING.

Application filed October 8, 1923. Serial No. 667,389.

This invention relates to propellers for aircraft and more particularly of propellers to that type in which the blades may be angularly adjusted by rotation on their own axes. The objects of my invention are to provide improved and effective means for securing the shank of a propeller blade in a suitable ferrule and simple and improved means for rotatably securing the ferrule in the propeller hub.

In order that the invention may be readily understood, reference is had to the accompanying drawing forming a part of this specification and in which:

Fig. 1 is a longitudinal sectional view showing the shank of a propeller blade secured in the ferrule and the ferrule mounted in the hub, only part of the blade and hub being shown;

Fig. 2 is a transverse section on the line 2—2 of Fig. 1;

Fig. 3 is an enlarged detailed sectional view showing the ribs or corrugations on the inner surface of the ferrule.

Referring to the drawings in detail, the numeral 10 indicates a part of the propeller hub, which is provided with a suitable socket. A ferrule 11 is rotatably mounted in this socket and the shank of the propeller blade 12 is secured in the ferrule as hereinafter pointed out in detail, it being understood that the hub is arranged to carry any desired number of blades.

Referring to the means for securing the blade in the ferrule 11 it will be noted that I provide the outer end of the ferrule with a flared or tapered portion A and that the inner end has a flared or tapered portion B, the result being that the ferrule has a constricted portion between the flaring end portions. The inner surface of the ferrule I preferably provide with corrugations indicated at C which may be circular, and formed by separate circular cuts on the inner surface of the ferrule, or spiral and made by a continuous spiral cut. As will be noted particularly from Fig. 3 the corrugations C are so formed that the walls 13 thereof incline toward the base or inner end of the ferrule, and the tops of the corrugations as indicated at 14 are preferably rounded. Such inclination and rounding of the corrugations facilitate introduction of the blade shank into the ferrule.

It will be understood that the shank of the blade is made somewhat larger than the inner diameter of the ferrule, that is, the shank is of such size that it will be considerably compressed when forced into the ferrule, the tapered portion A of the ferrule acting to cause such compression. As a result the outer surface of the blade shank will closely contact with the inner surface of the ferrule. In order to cause the material of the shank to be more firmly pressed against and into the corrugations on the inner surface of the ferrule, the shank is made hollow or provided with a bore or hole 15 preferably circular which extends axially thereof preferably to a distance approximately equal to the length of the ferrule, and a plug 16 is forced into this hole. The base portion of this plug or that nearest the inner end of the ferrule is tapered as at 16$^a$ which tapered portion serves to expand the inner end of the shank and press it into tight engagement with the inner surface of the ferrule. The point of the plug 16 is also tapered at 16$^b$ to facilitate its insertion into the hollow shank. It will thus be understood that when the shank of the blade has been forced into the ferrule and expanded by means of the plug 16 into close engagement with the corrugated wall thereof, the shank will be firmly held against withdrawal from the ferrule. In connection with the foregoing a circular wedge 17 or series of flat wedges may also be driven into the shank around the plug 16 for further compressing the butt of the shank and forcing it against the corrugated wall of the ferrule.

In addition to the compression and expansion of the blade shank against the inner wall of the ferrule, I provide further holding means in the form of a series of spikes or keying pins 18 which extend through inclined holes in the wall of the ferrule 11 and into the material of the blade shank, these pins preferably being arranged at an angle of about 30 degrees to the axis of the blade. To accommodate such pins or keys, the outer surface of the ferrule is provided with one or more ribs 19, each of which has two series of inclined holes, the holes in each series being alternately disposed so that one series of pins 18 incline toward the inner end of the propeller blade and the other series toward the outer end. Preferably the pins of the first series are headless and held in the ribs 19 by plugs 20 threaded into the holes through which the pins enter, the other series, i. e., those pointing outwardly being provided with heads. It is preferable that some of the pins 18 be of sufficient length to extend into the plug 16. This serves to securely hold the plug in place.

As a further means for obtaining secure fastening of the blades in the ferrule, I prefer to coat the exterior of the blade and the interior of the ferrule with a suitable cement and to have the ferrule in a heated condition when the blade is forced under hydraulic pressure into the ferrule, the temperature being sufficient to soften the cement. The pins or spikes 18 are also preferably heated and coated with cement and driven through the holes in the ferrule and into the shank while still in a heated condition.

Any suitable mechanism may be used for rotating the blade. In the drawing there is shown a gear wheel 21 rigidly secured to the inner end of the ferrule which is adapted to cooperate with blade rotating mechanism such as that disclosed in my copending application Serial No. 356,040, filed Feb. 13, 1920.

In the accompanying drawings I have also disclosed a simple and effective means for rotatably securing the ferrule in the hub. For this purpose the ferrule is provided with a rib 22 on its exterior surface near its inner end this rib being shaped to produce a shoulder facing outwardly. The outer or end portion 10ª of the hub socket is somewhat larger in diameter than the ferrule and is threaded interiorly. An exteriorly threaded ring 23 is arranged between the ferrule 11 and the portion 10ª of the hub. This ring may be screwed into the threaded portion of the socket, its front end having a shoulder between which and the shoulder on the ferrule, there is arranged a suitable thrust bearing 24 preferably a ball bearing of the combined radial and end thrust type. The inner end of the ferrule is arranged in the hub socket so that lateral movement of the blade is further prevented by this means.

It is to be understood that the invention is not limited to the precise details herein described as various modifications within the scope and principle thereof may be made.

Having thus described the invention what is claimed as new and desired to be secured by Letters Patent is:

1. In a propeller blade mounting, the combination of a ferrule, a blade shank inserted therein, a plurality of fastening devices extending thru the wall of the ferrule and into the material of the shank, certain of said devices being arranged at an acute angle to the axis of the shank and projecting toward the inner end of the shank, the outer ends of said inwardly projecting devices being located below the outer surface of said ferrule, and a screw plug inserted in the ferrule engaging the outer end of each of said inwardly projecting devices.

2. In a propeller blade mounting, the combination of a ferrule, a blade shank inserted therein, a plurality of fastening devices extending thru the wall of the ferrule and into the material of the shank, certain of said devices being arranged at an acute angle to the axis of the shank and projecting toward the inner end of the shank, the outer ends of said inwardly projecting devices being located below the outer surface of said ferrule, and means carried by the ferrule engaging the outer end of each of said inwardly projecting devices to retain them in position.

3. In a propeller blade mounting, the combination of a ferrule, a blade shank inserted therein, and a plurality of fastening devices extending through the wall of the ferrule and into the material of the shank, certain of said devices being arranged at an acute angle to the axis of the shank and projecting toward the inner end of the shank.

4. In a propeller blade mounting, the combination of a ferrule, a blade shank inserted therein, and a plurality of fastening devices extending through the wall of the ferrule and into the material of the shank, said devices being arranged at an angle to the axis of the blade, certain of said devices projecting toward the inner end of the blade and others projecting toward the outer end thereof.

5. In a propeller blade mounting, the combination with a ferrule, a hollow blade shank arranged therein, a tapered plug inserted in the hollow of said shank for forcing the outer surface thereof against the inner surface of the ferrule, and a plurality of fastening devices extending through the wall of said ferrule and into the material of said shank and plug, said devices being arranged at an acute angle to the axis of said shank and projecting toward the inner end of the shank.

6. In a propeller blade mounting, the combination with a ferrule having a rib on its exterior surface intermediate its ends, said rib having a plurality of holes extending through the same, said holes being arranged at an angle to the longitudinal axis of the ferrule, a blade shank inserted in the ferrule, a plurality of fastening devices extending through said inclined holes and into the material of the shank, and means for expanding said shank against the inner surface of the ferrule.

7. In a propeller blade mounting, the combination with a ferrule having a circumferential rib on its exterior surface, said rib having a plurality of inclined holes therein, some of said holes being inclined towards the base or inner end of the ferrule and others being inclined toward the outer end of the ferrule, a blade shank inserted in said ferrule, fastening devices extending through said inclined holes and into the material of the shank, and means for forcing the outer surface of the shank into engagement with the inner surface of the ferrule.

8. In a propeller blade mounting the combination with a ferrule having a circumferential rib on its exterior surface, said rib having a plurality of inclined holes therein, some of said holes being inclined towards the base or inner end of the ferrule and others being inclined toward the outer end of the ferrule, a blade shank inserted in said ferrule, means for forcing the outer surface of the shank into engagement with the inner surface of the ferrule, fastening devices extending thru said inclined holes into the material of the shank, the devices extending thru said outwardly inclined holes having heads engaging the outer surface of the rib, the devices extending thru said inwardly inclined holes having their outer ends disposed below the outer surface of the rib, and means carried by the rib for engaging the outer ends of the devices in the inwardly inclined holes.

9. In a propeller blade mounting, the combination with a ferrule having corrugations on its inner surface, the face of said corrugations being inclined toward the base of the ferrule and the tops of said corrugations being rounded, a blade shank inserted in said ferrule, and means for compressing the outer surface of the shank against said corrugations.

10. In a propeller blade mounting, the combination with a ferrule having an intermediate restricted portion and outwardly flaring end portions, corrugations in the form of a helix formed on the inner surface of the ferrule, the face of said corrugations being inclined toward the center of the base of the ferrule and the tops of the corrugations being rounded, a plurality of circumferential ribs formed on the outer surface of the ferrule at its restricted portion, each of said ribs having a plurality of inclined holes therein, some of said holes being inclined towards the base or inner end of the ferrule and others being inclined toward the outer end of the ferrule, a blade shank inserted in said ferrule, said shank having an axial bore at its inner end, a tapered plug inserted in said hose for compressing the material of the shank against said corrugations, a plurality of fastening devices extending thru the inclined holes of each rib and into the material of said shank and plug, the devices extending thru said outwardly inclined holes having heads engaging the outer surface of the rib, the devices extending thru said inwardly inclined holes having their outer ends disposed below the outer surface of the rib, and screw plugs fitting the inwardly inclined holes and engaging the outer ends of the devices therein.

11. In a propeller blade mounting the combination of a hub having a cylindrical socket, a ferrule rotatably mounted in said socket and having a cylindrical inner end adapted to closely fit in said socket, said ferrule having an integral shoulder thereon arranged outwardly from said cylindrical portion, a ring surrounding said ferrule and threaded into the outer end of said socket, a thrust bearing arranged between said shoulder and said ring, a shank arranged in said ferrule and having an axial bore, a plug arranged in said bore, a plurality of fastening devices extending thru said ferrule and into the material of said shank and plug, said devices being arranged at an acute angle to the axis of said shank.

12. In a propeller blade mounting the combination of a hub and a cylindrical socket, a ferrule rotatably mounted in said socket, said ferrule having a cylindrical inner end adapted to closely fit said socket, said ferrule having a shoulder thereon arranged outwardly beyond said cylindrical portion, a ring surrounding said ferrule and threaded into said socket, a thrust bearing between said ring and said shoulder, a rib on said ferrule arranged outwardly beyond said shoulder, a shank mounted in said ferrule and having a bore, a plug arranged in said bore, and a plurality of fastening devices extending thru said rib and into the material of said shank and plug, said device being arranged at an acute angle to the axis of said shank.

In testimony whereof I hereunto affix my signature.

SPENCER HEATH.